United States Patent
Dittmer et al.

(10) Patent No.: US 7,156,359 B2
(45) Date of Patent: Jan. 2, 2007

(54) SECURE MOUNTING SYSTEM FOR OVERHEAD MOUNTED PROJECTOR

(75) Inventors: Jay Dittmer, Prior Lake, MN (US); Jeff Bremmon, Shakopee, MN (US)

(73) Assignee: CSAV, Inc., Savage, MN (US)

(*) Notice: Subject to any disclaimer, the term of this patent is extended or adjusted under 35 U.S.C. 154(b) by 0 days.

(21) Appl. No.: 10/821,659

(22) Filed: Apr. 9, 2004

(65) Prior Publication Data

US 2004/0211872 A1    Oct. 28, 2004

Related U.S. Application Data

(60) Provisional application No. 60/462,391, filed on Apr. 11, 2003.

(51) Int. Cl.
   *F16M 13/00* (2006.01)
(52) U.S. Cl. .................. 248/551; 248/917; 352/242
(58) Field of Classification Search .......... 248/317, 248/323, 324, 343, 917, 920, 923, 918, 551; 70/164, 14, 58, 232, 18; 348/373, 151, 375, 348/825, 836, 839; 352/242, 243; 353/119
See application file for complete search history.

(56) References Cited

U.S. PATENT DOCUMENTS

| | | | |
|---|---|---|---|
| 4,080,629 A * | 3/1978 | Hammond et al. | 348/373 |
| 4,225,881 A * | 9/1980 | Tovi | 348/151 |
| 4,352,614 A | 10/1982 | Hirsch | |
| 4,709,897 A | 12/1987 | Mooney | |
| 4,771,273 A | 9/1988 | Test et al. | |
| 4,964,606 A * | 10/1990 | Beam et al. | 248/333 |
| 4,993,676 A | 2/1991 | Fitts et al. | |
| 5,009,384 A | 4/1991 | Gerke et al. | |
| 5,120,168 A | 6/1992 | Padula | |
| 5,169,114 A | 12/1992 | O'Neill | |
| 5,269,208 A | 12/1993 | Kolvites et al. | |
| 5,383,641 A | 1/1995 | Bergetz | |
| 5,490,655 A | 2/1996 | Bates | |
| 5,551,658 A * | 9/1996 | Dittmer | 248/329 |
| 5,621,846 A | 4/1997 | Smith et al. | |
| 5,697,743 A | 12/1997 | Parker | |
| 5,730,410 A | 3/1998 | Archamboult et al. | |
| 5,730,567 A | 3/1998 | Haseley et al. | |
| 5,938,161 A * | 8/1999 | Takeuchi et al. | 248/343 |
| 5,946,404 A | 8/1999 | Bakshi et al. | |
| 5,964,560 A | 10/1999 | Henriksen | |
| 6,042,068 A | 3/2000 | Tcherny | |
| 6,341,927 B1 | 1/2002 | Hampson et al. | |
| 6,527,238 B1 * | 3/2003 | Shental et al. | 248/276.1 |
| 6,595,379 B1 | 7/2003 | Powell | |
| 6,606,887 B1 * | 8/2003 | Zimmer et al. | 70/164 |
| 6,619,161 B1 | 9/2003 | Blair | |
| 6,708,940 B1 * | 3/2004 | Ligertwood | 248/324 |
| 6,899,240 B1 * | 5/2005 | Dang et al. | 220/3.8 |
| 7,029,133 B1 * | 4/2006 | Challis | 353/119 |
| 2004/0080665 A1 * | 4/2004 | Lovell | 348/373 |

* cited by examiner

*Primary Examiner*—A. Joseph Wujciak
(74) *Attorney, Agent, or Firm*—Patterson, Thuente, Skaar & Christensen, P.A.

(57) ABSTRACT

An adjustable tamper-resistant overhead mounting system for a projector. The system includes brackets attachable to the projector and a suspension member attached to an overhead structure. At least one tamper resistant fastener is used at each connection of the brackets, the projector and the suspension member, to deter theft and tampering. The arrangement of the brackets may enable easy adjustable positioning of the projector about pitch, roll and yaw axes. The projector may also be enclosed in an enclosure system to protect against contact by foreign objects. The enclosure is adapted to be installable without removing the projector or otherwise disturbing the mounting system.

6 Claims, 10 Drawing Sheets

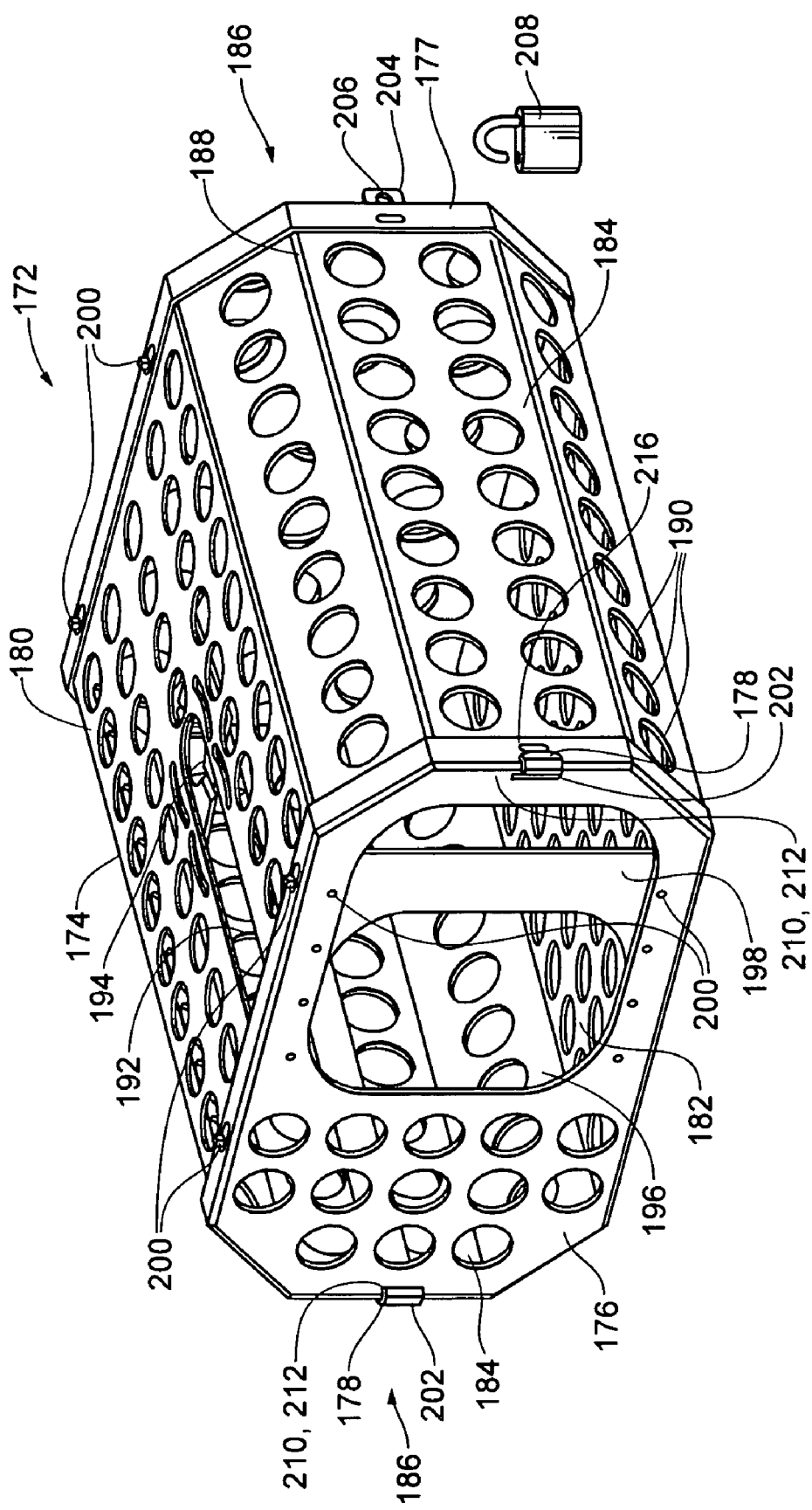

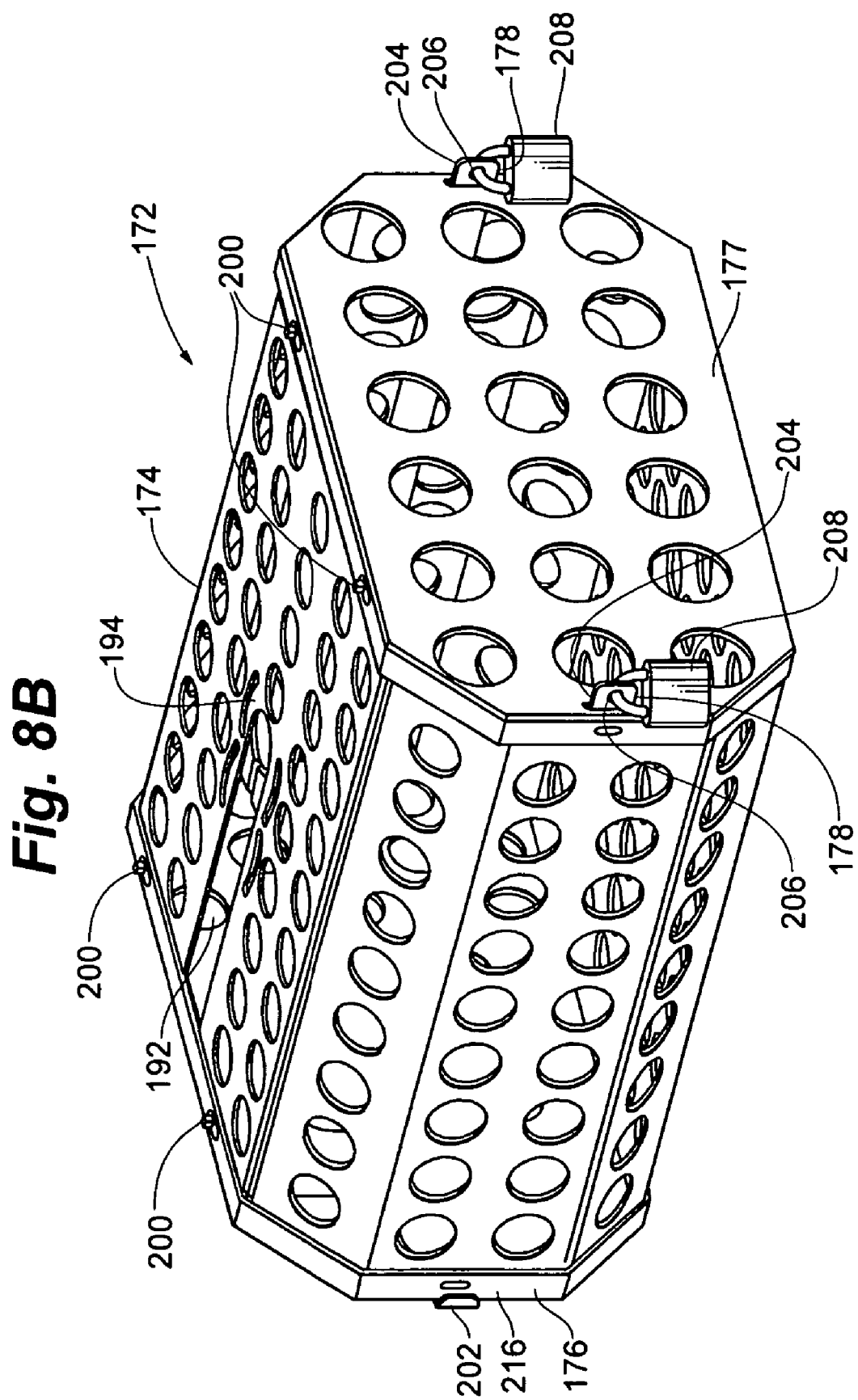

SECURE MOUNTING SYSTEM FOR OVERHEAD MOUNTED PROJECTOR

RELATED APPLICATIONS

This application claims the benefit of U.S. Provisional Patent Application Ser. No. 60/462,391 filed Apr. 11, 2003, the same being hereby fully incorporated herein by reference.

FIELD OF THE INVENTION

The present invention relates to mounting systems for visual projectors, and more specifically, to tamper resistant mounting systems for projectors.

BACKGROUND OF THE INVENTION

Visual projection systems are commonly used for displaying and presenting visual information to groups of people. Such visual projection systems typically include a projector unit and a projection screen.

In spaces such as classrooms, conference rooms, and public assembly halls, where the space is often used for presentations, it is common that the projector unit be installed as a more or less permanent fixture in the space. Often, the projector will be suspended from an overhead structure, such as a building floor/ceiling assembly or roof, in order to give the projector an unobstructed projection path and to protect it from damage by inadvertent contact. It is generally desirable that the mount be adjustably positionable over a wide range of positions to enable proper aiming and focusing of the projector.

Projectors, particularly LCD, CRT, and DRP projectors designed for frequent use in a setting such as described above are quite expensive. In addition, the spaces where the projector is installed may be unsecured for periods of time or left unattended. Consequently, a problem is that projector units are attractive targets for theft, vandalism and other tampering.

Another problem is that in some multi-use spaces, such as gymnasiums, the projector unit can be exposed to the possibility of unintentional or intentional contact by objects such as balls or other similar flying objects. In other multi-use spaces such as hotel conference facilities, the projector unit may be subject to contact by ladders, maintenance person lifts and the like during set-up and take-down of exhibits and booths.

What is needed in the industry is an easy-to-use adjustable ceiling mounted projector mounting system that substantially alleviates these problems.

SUMMARY OF THE INVENTION

The present invention is an adjustable tamper-resistant overhead mounting system for a an LCD, CRT or DCP projector that addresses the aforementioned need in the industry. The adjustable mount bracket of the present invention includes brackets attachable to the projector and a suspension member attached to an overhead structure. At least one tamper resistant fastener is used at each connection of the brackets, the projector and the suspension member, to deter theft and tampering. The brackets enable inverted mounting of the projector from the ceiling structure of a space. The arrangement of the brackets may enable easy adjustable positioning of the projector about pitch, roll and yaw axes. The projector may also be enclosed in an enclosure system to protect against contact by foreign objects. The enclosure is adapted to be installable without removing the projector or otherwise disturbing the mounting system.

A tamper resistant mounting system for adjustably attaching a visual projection device to a suspension member that is fixedly attached to an overhead structure includes a device interface bracket attachable to the projection device with at least one tamper resistant fastener. The device interface bracket is operably coupled to a suspension member interface portion. The suspension member interface portion is attachable to the suspension member with at least one tamper resistant fastener and is secured to the device interface bracket with at least one tamper resistant fastener.

The mounting system may further include an enclosure adapted to enclose the visual projection device. The enclosure includes an integral surround portion having a top, a bottom, a pair of opposing sides, and a pair of open ends. A pair of end caps is provided to fit over and close the open ends. Each of the end caps is secured to the surround portion with at least one tamper resistant fastener, and enclosure is secured to the tamper resistant mounting system with at least one tamper resistant fastener. At least one lock and an elongate locking bar may be provided to secure the end caps on the enclosure.

BRIEF DESCRIPTION OF THE DRAWINGS

FIG. 8A is a front perspective view of the enclosure;

FIG. 8B is a rear perspective view of the enclosure;

DETAILED DESCRIPTION OF THE PREFERRED EMBODIMENTS

A tamper resistant visual projector mounting system 10 generally includes an adjustable bracket 12 and a suspension member 14.

Figure 1:
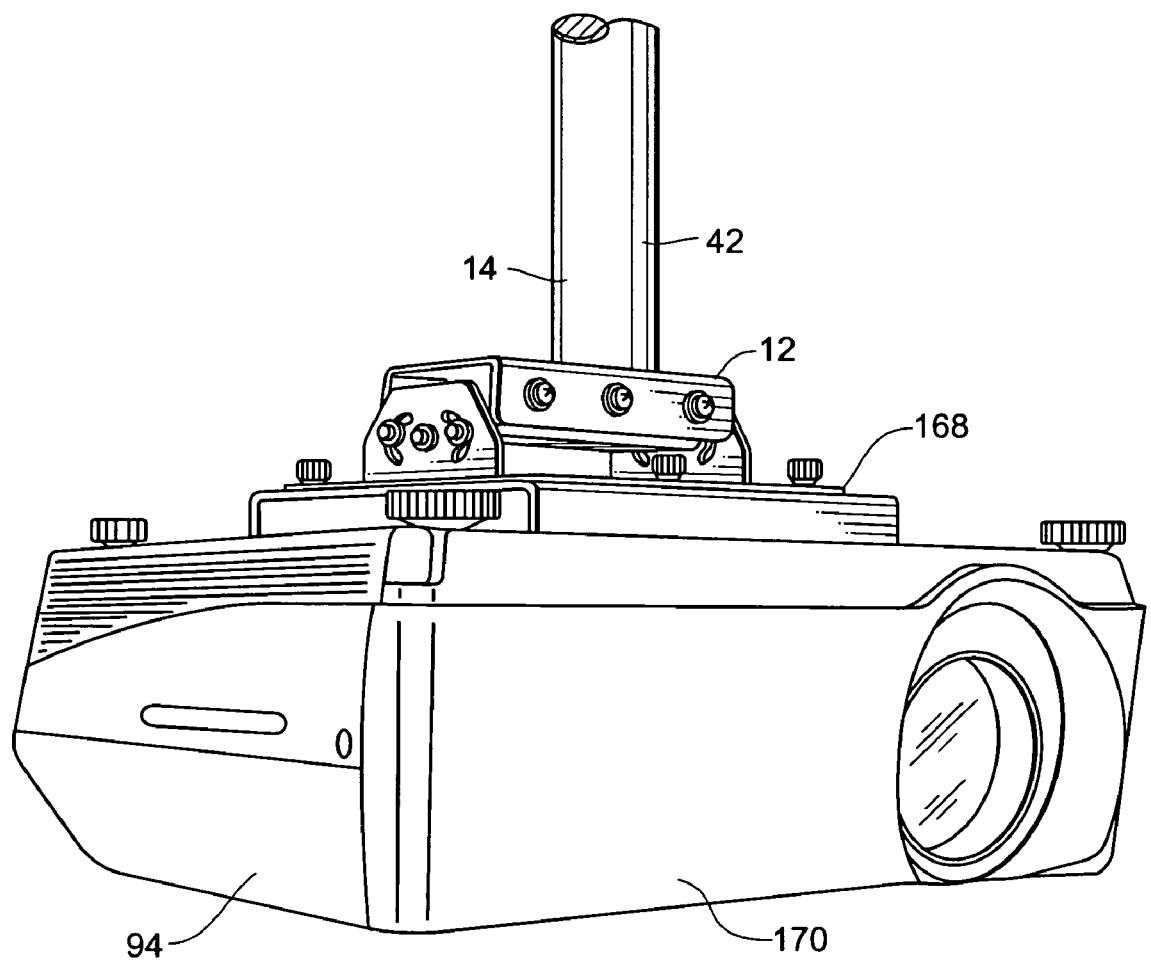
FIG. 1 is a perspective view of a projector and tamper resistant mounting system according to the present invention.
Figure 2:
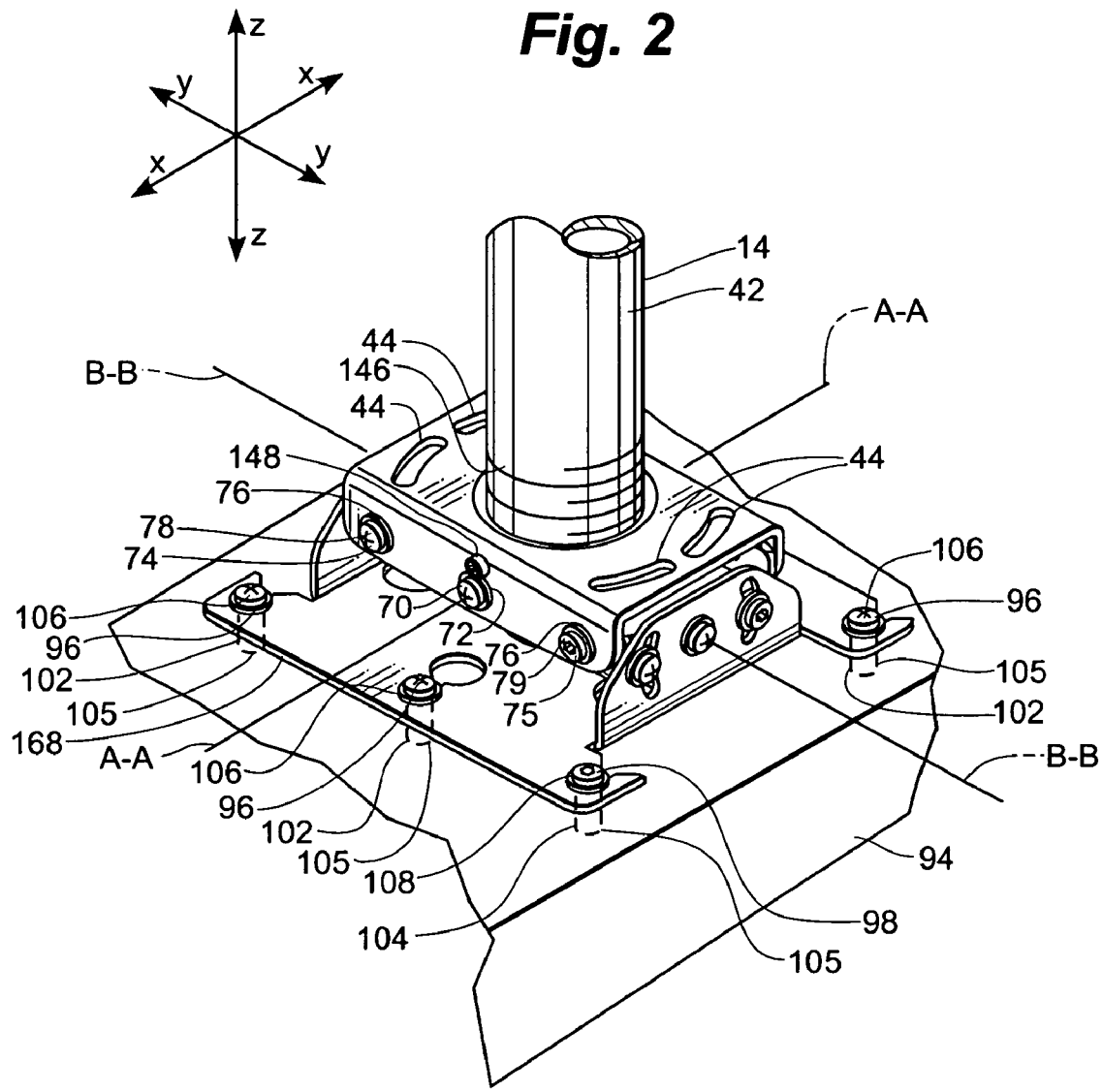
FIG. 2 is a partial perspective view of a tamper resistant adjustable mount bracket according to present invention.
Figure 3:
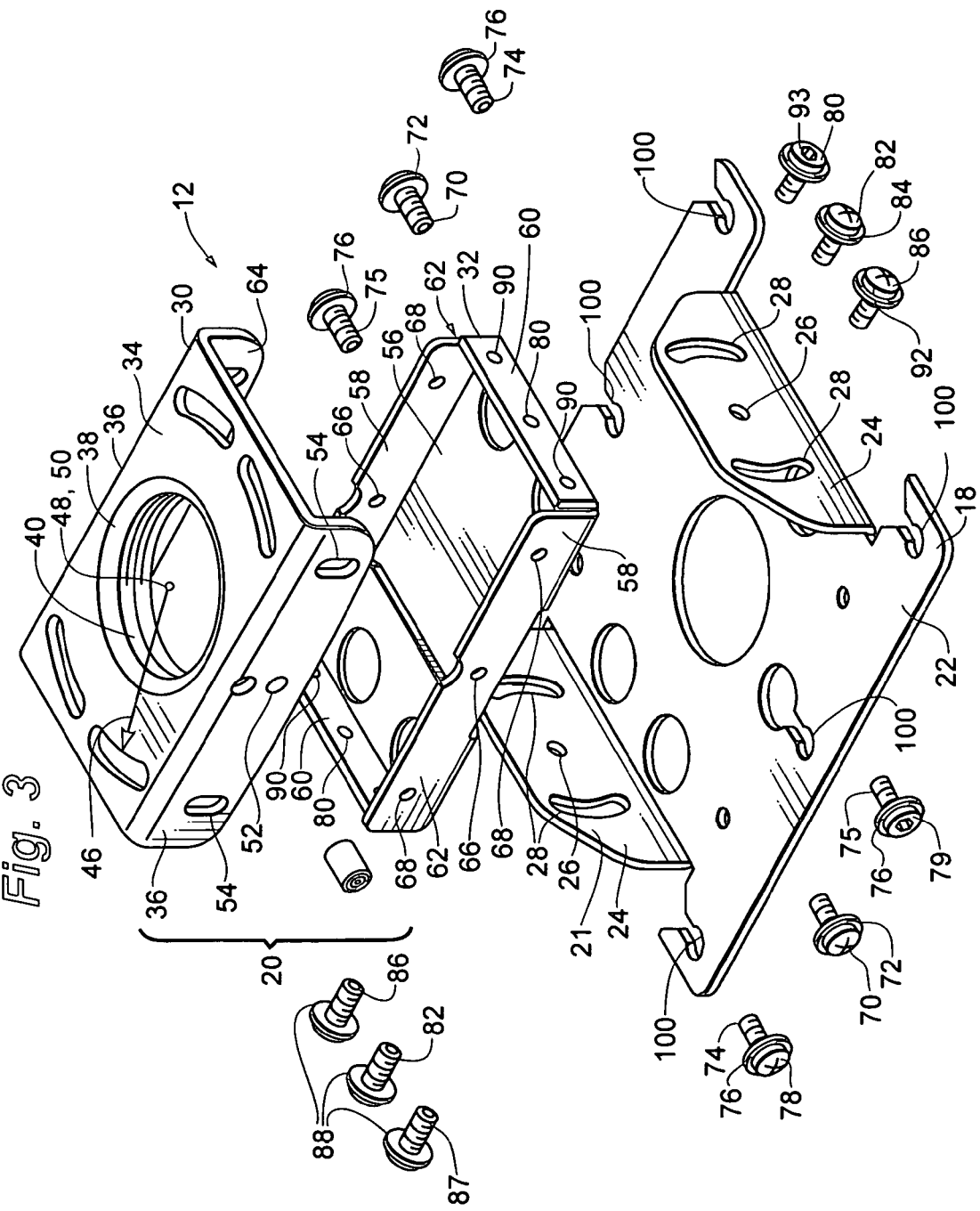
FIG. 3 is an exploded view of the adjustable mount bracket of FIG. 2.

FIG. 2 designates, for reference purposes, the relative directions of x-y-z coordinates as applied to the mounting system 10. Any reference herein to rotation about an x-axis or "roll" movement, a y-axis or "pitch" movement, or a z-axis or "yaw" movement, relates to these coordinate axes. The y-axis is oriented fore-and-aft relative to a visual projector attached to the mounting system, the z-axis is vertical and the x-axis is perpendicular to the z-axis and the y-axis, and is oriented laterally from side-to-side of the projector.

Adjustable bracket 12 generally includes device interface bracket 18 and suspension member interface 20. Device interface bracket 18 includes planar portion 22 and a pair of spaced-apart upwardly projecting flanges 24. Each flange 24 has a central hole 26 and a pair of opposing curved slots 28 surrounding hole 26.

Suspension member interface 20 generally includes an upper portion 30 and a lower portion 32. Lower portion 32 is dimensioned so as to fit within upper portion 30. Upper portion 30 has flat portion 34 and a pair of downwardly projecting side portions 36. Flat portion 34 has a central aperture 38 with interior threads 40 for receiving a suspension member 14 in the form of a threaded pipe hanger 42. A plurality of curved slots 44 for receiving a suspension member 14 in the form of rod hangers 45 are arranged symmetrically on either side of central aperture 38. Each curved slot 44 has a radius of curvature 46 with a center 48 generally corresponding with the center 50 of central aperture 38. Each side portion 36 has an aperture 52 with a pair of slots 54 arranged symmetrically on either side of aperture 52.

Lower portion 32 has a flat portion 56, upwardly directed sides 58, and upwardly directed ends 60. Sides 58 are spaced apart so as to fit between side portions 36 of upper portion 30 with outer surfaces 62 confronting inner surfaces 64 of side portions 36. Similarly, ends 60 are spaced apart so as to fit between flanges 24 of mounting plate 18. Each side 58 has a central threaded hole 66 located so as to correspond with aperture 52 when lower portion 32 is disposed within upper portion 30. Similarly, threaded holes 68 are located so as to correspond with slots 54. Threaded fastener 70, having a washer 72, extends through aperture 52 and threads into threaded hole 66 in each of sides 58, so that upper portion 30 is rotatably attached to lower portion 32 about an axis, annotated A—A, extending through apertures 52. Threaded fastener 74 and tamper resistant threaded fastener 75, each with a washer 76, extend through each of slots 54 and thread into threaded holes 68.

Figure 4:
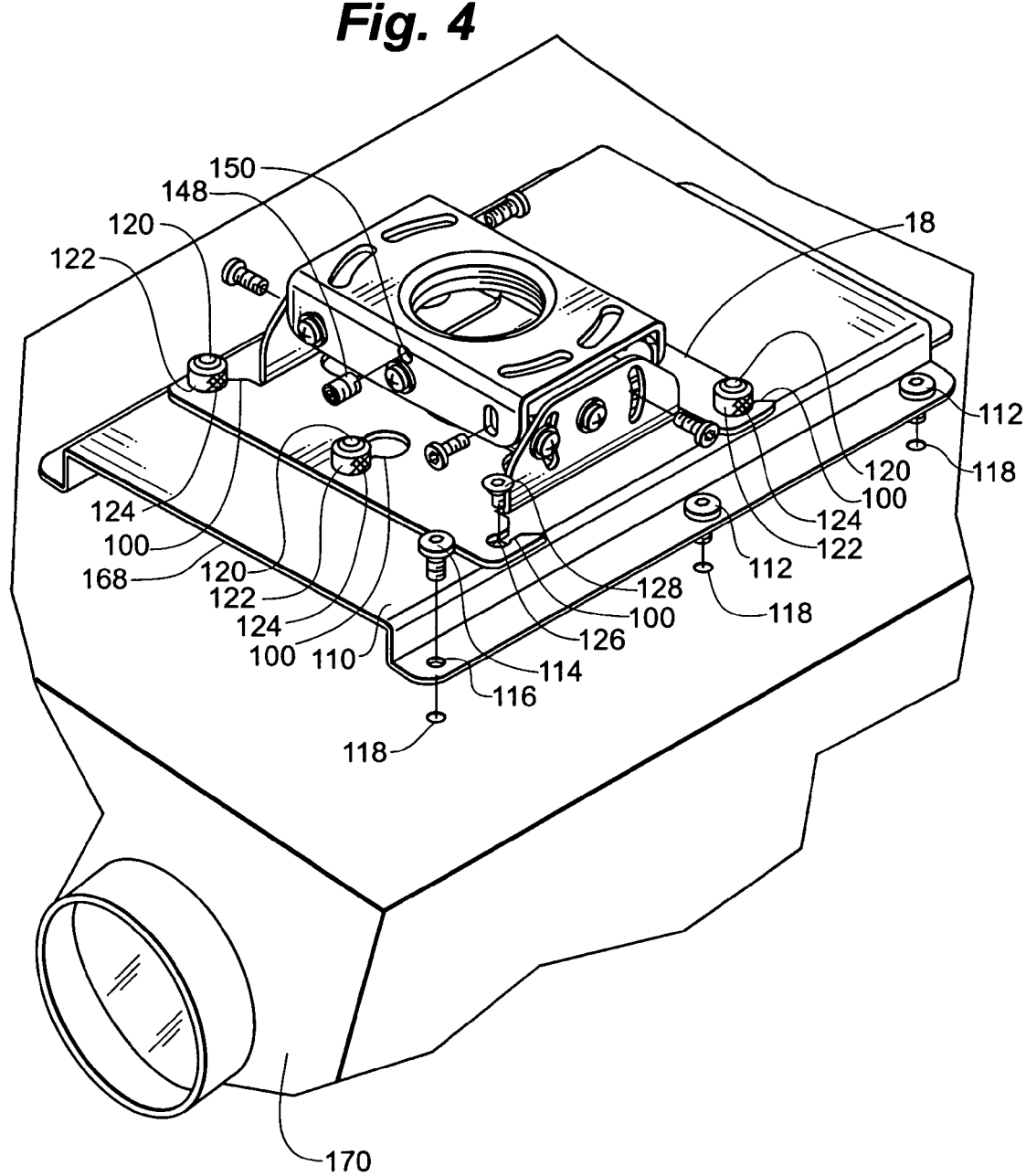
FIG. 4 is a partial exploded view of the adjustable mount bracket on a projector, depicting the locations of tamper resistant fasteners.
Figure 4A:
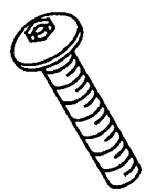
FIG. 4A is a perspective view of a hex-pin tamper resistant fastener.
Figure 4B:
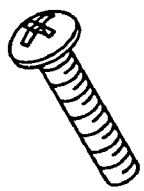
FIG. 4B is a perspective view of a Phillips-pin tamper resistant fastener.
Figure 4C:
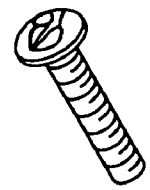
FIG. 4C is a perspective view of a one-way slotted tamper resistant fastener.
Figure 4D:
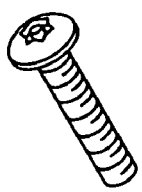
FIG. 4D is a perspective view of a Torx® pin tamper resistant fastener.
Figure 4E:
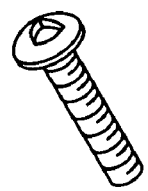
FIG. 4E is a perspective view of a TP3® tamper resistant fastener.
Figure 4F:
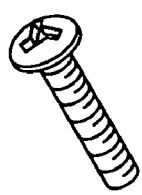
FIG. 4F is a perspective view of Tri-Wing® tamper resistant fastener.

Tamper resistant threaded fastener 75, and any other tamper-resistant fastener or set-screw referred to herein, may be any of a wide variety of tamper resistant fastener head designs such as those depicted in FIGS. 4A–4F, including the standard hex-pin design of FIG. 4A, the standard Phillips-pin design of FIG. 4B, and the one-way slotted design of FIG. 4C, each of which is designed for installation and removal with a special tool having a limited availability to the general public. In addition to the standard tamper resistant fastener designs listed above, any other tamper resistant or security fastener may be suitably used, including unique proprietary designs such as the Torx® pin design of FIG. 4D, made by the CamCar Division of Textron, Inc., the TP3® design of FIG. 4E, made by Tamperproof Screw Co., Inc., and the Tri-Wing® design of FIG. 4F, made by Phillips Screw Co.

When tightened, the head portion 78, 79, of each fastener 74, 75, compresses washer 76 against side portion 36, thus enabling a frictional adjustment for fixing upper portion 30 in a selected rotational position relative to lower portion 32. Once tightened, tamper resistant threaded fasteners 75 impede any attempt to separate lower portion 32 from upper portion 30 without the special tool for installing and removing the tamper resistant fasteners.

Although two tamper resistant fasteners 75 are depicted, one extending through each side portion 36, it will be appreciated that one tamper resistant fastener 75 may used, and will impede tampering to a somewhat more limited degree. Similarly, if desired, additional tamper resistant fasteners 75 may be used in place of regular fasteners 74 if desired to provide additional impediments to tampering and theft.

Each end 60 of lower portion 32 has a central threaded hole 80 corresponding with central hole 26 in each flange 24 of device interface bracket 18. A threaded fastener 82, having a washer 84, extends through central hole 26 of each flange 24, and threads into threaded hole 80, so that lower portion 32, and suspension member interface 20, is rotatably attached between flanges 24 about an axis, annotated B—B, extending through central holes 26. Threaded fastener 86, and tamper resistant threaded fastener 87, each with a washer 88, extend through curved slots 28 and thread into threaded holes 90 in ends 60. As before, tamper resistant fastener 87 may be any suitable tamper resistant or security fastener, and one or any other number of tamper resistant fasteners 87 may be used as desired. When tightened, the head portion 92, 93, of each threaded fastener 86, 87, compresses washer 88 against flange 24, thus enabling a frictional adjustment for fixing lower portion 32 in a selected rotational position relative to device interface bracket 18. Once tightened, tamper resistant threaded fasteners 87 impede any attempt to separate suspension member interface 20 from device interface bracket 18 without the special tool for installing and removing the tamper resistant fasteners.

Device interface bracket 18 may be directly fastened to a projector 94 using fasteners 96, and at least one tamper resistant fastener 98, as depicted in FIG. 2. Again, tamper resistant fastener 98 may be any suitable tamper resistant fastener, and one or any other number of tamper resistant fasteners 98 may be used as desired. Device interface bracket 18 has a plurality of slots 100. Each slot 100 is dimensioned so as to fit around the shank 102, 104, of each fastener 96, 98.

Threaded fasteners 96, 98, may be partially threaded into holes 105 in projector 94. Device interface bracket 18 may then be slid into position so that slots 100 are engaged around the shanks 102, 104, of the fasteners 96, 98. When the fasteners 96, 98, are tightened, device interface bracket 18 is trapped between the head portions 106, 108, of fasteners 96, 98, and projector 94, thereby securing device interface bracket 18 to projector 94. Device interface bracket 18 may be removed from projector 94 by loosening fasteners 96, 98, and sliding device interface bracket 18 so that slots 100 are disengaged from fasteners 96, 98. It will of course be appreciated that additional security may be provided by substituting apertures for slots 100 so that device interface bracket 18 may be removed from projector 94 only by completely unthreading the fasteners, including tamper resistant fastener 98.

As an alternative to direct fastening to a projector 94, adapter plate 110 may be provided. Adapter plate 110 is secured to projector 94 with fasteners 112, and at least one tamper resistant fastener 114. Fasteners 112, 114, extend through apertures 116 in adapter plate 110 and thread into threaded holes 118 in projector 94. Adapter plate 110 has a plurality of upwardly projecting studs 120, each with a nut 122. The studs 120 are positioned so as to correspond with the location of slots 100 in device interface bracket 18. Each nut 122 may have a knurled portion 124 so that the nut 122 may be threaded on the stud 120 by hand. In addition, adapter plate 110 has a threaded hole 126 in place of one stud 120. Threaded hole 126 receives a tamper resistant fastener 128.

Adapter plate 110 is secured to the projector 94 using fasteners 112 and tamper resistant fastener 114. Nuts 122 are partially threaded onto studs 120, and tamper resistant fastener 128 is partially threaded into threaded hole 126. Device interface bracket 18 is then slid into position so that slots 100 are engaged with studs 120 and tamper resistant fastener 128 are then tightened, securing device interface bracket 18 to adapter plate 110, and thereby to projector 94.

Figure 5:
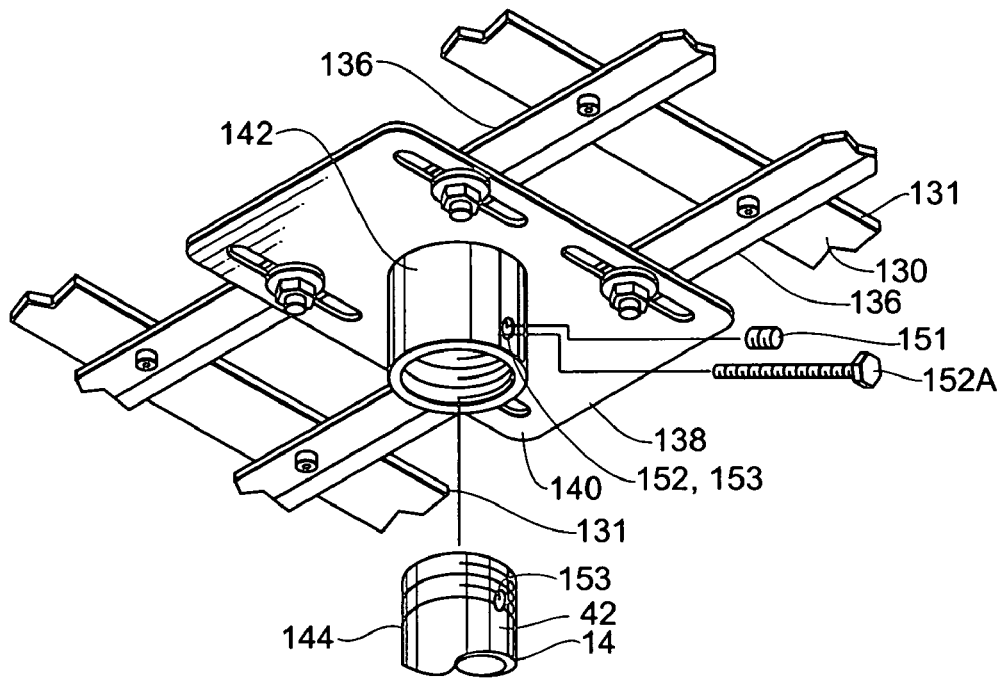
FIG. 5 is a perspective view of a connection of one embodiment of a suspension member to a floor/ceiling or roof assembly of a structure.

A suspension member 14, in the form of threaded pipe hanger 42 may be secured to an overhead structure 130 by any suitable method. In one example, depicted in FIG. 5, overhead structure 130 is a floor/ceiling or roof assembly of a building, including parallel structural members 131, which may be trusses, I-beams, wooden joists, or any other such structural member. A pair of channels 136 is positioned spanning adjacent parallel structural members 131, and are fastened or welded in place. A hanger bracket 138 may then be fastened or welded to the channels 136. Hanger bracket 138 has a plate portion 140 and a pipe nipple 142, which is positioned so as to face downwardly. One end 144 of threaded pipe hanger 42 is threaded into pipe nipple 142. The other end 146 of threaded pipe hanger 42 is threaded into central aperture 38 of suspension member interface 20, so that adjustable bracket 12 and an attached projector 94 are suspended from the overhead structure 130 by threaded pipe hanger 42.

A tamper resistant set screw 148 may be threaded into tapped hole 150 to stake threaded pipe hanger 42 in position and inhibit tampering or theft accomplished through unthreading of pipe hanger 42. Similarly, pipe hanger 42 may be fixed within pipe nipple 142 by a tamper resistant setscrew 151 inserted through tapped hole 152. Alternatively, particularly where the structural connection of pipe hanger 42 is above a concealing structure such as a suspended ceiling, pipe hanger may be fixed to pipe nipple 142 by welding, or with a fastener 152A inserted through a hole 153 drilled through the threaded connection of pipe hanger 42 and pipe nipple 142.

Figure 4G:
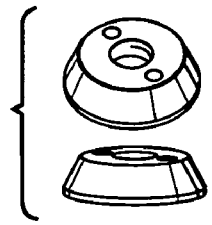
FIG. 4G is a view of a pair of tamper resistant spanner nuts.
Figure 6:
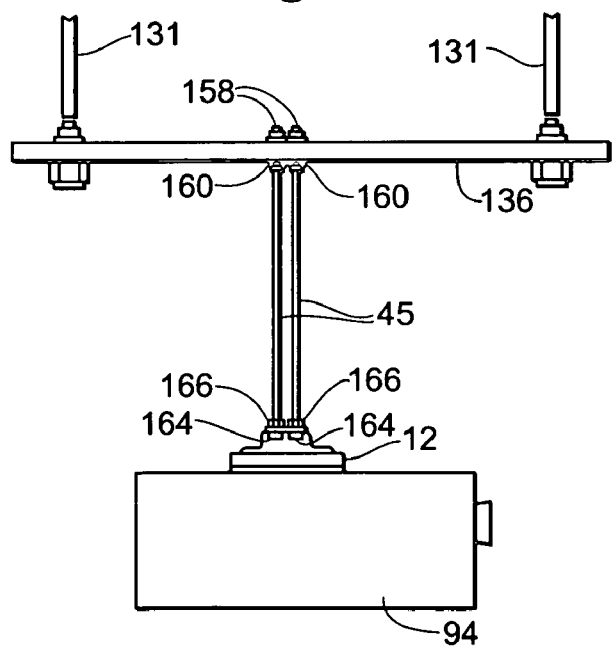
FIG. 6 is a side elevation view of an alternative suspension member embodiment with a connection to a floor/ceiling or roof assembly of a structure.
Figure 7:
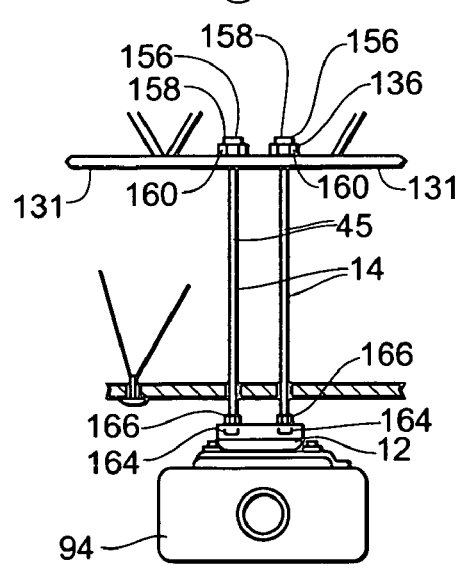
FIG. 7 is a front elevation view of the embodiment of FIG. 6.

As an alternative, a plurality of suspension members 14 in the form of rod hangers 45 may be used to suspend adjustable bracket 12 and attached projector 94 as depicted in FIGS. 6 and 7. Again, channels 136 are arranged spanning parallel structural members 131. Channels 136 have apertures 154 for receiving an end 156 of each rod hanger 45. The rod hangers 45 may be formed from threaded rod stock. Each rod hanger 45 is attached to the channel with topside nut 158 and bottom side jam nut 160. The other end 162 of each rod hanger 45 passes through one of curved slots 44. Bottom side nut 164 and topside jam nut 166 secure the rod hanger 45 within each curved slot 44. It will of course be appreciated that tamper resistant spanner nuts, such as depicted in FIG. 4G, or any other type of tamper resistant nut, may be used for top side nut 158 or bottom side nut 164 to provide tamper resistant to the connection.

The operation of tamper resistant visual projector mounting system 10 may now be understood with reference to FIGS. 1–4. Device interface bracket 18 may be mounted on a projector 94 with front side 168 of the bracket 18 aligned with the front side 170 of the projector 94. Suspension member interface 20 is attached to a suspension member 14, which is in turn attached to an overhead structure as described above. When suspended as described, the A—A axis, about which upper portion 30 and lower portion 32 of suspension member interface 20 are rotatably attached, is oriented generally in the x-axis direction. Correspondingly, the B—B axis, about which device interface bracket 18 and suspension member interface portion 20 are rotatably attached, is oriented generally in the y-axis direction.

It will be appreciated that the connection between device interface bracket 18 and suspension member interface portion 20 described above enables selective relative rotational movement of projector 94 about the y-axis, thereby enabling a "pitch" adjustment for the projector 94. Similarly, the connection between upper portion 30 and lower portion 32 of suspension member interface portion 20, enables selective relative rotational movement of the projector generally about the x-axis, thereby enabling a "roll" adjustment for the projector 94. Finally, the connection between suspension member interface 20 and suspension member 14 enables rotation of the projector about the z-axis, thereby enabling a "yaw" adjustment for the projector 94.

At least one tamper resistant fastener is provided at the connection between projector 94 and device interface bracket 18, at the connection between device interface bracket 18 and suspension member interface bracket 20, and optionally between suspension member interface bracket 20 and suspension member 14. These tamper resistant fastener connections provide a significant impediment to common everyday tampering or theft of the projector without unduly inhibiting usability of the projector by authorized users.

Figure 8:
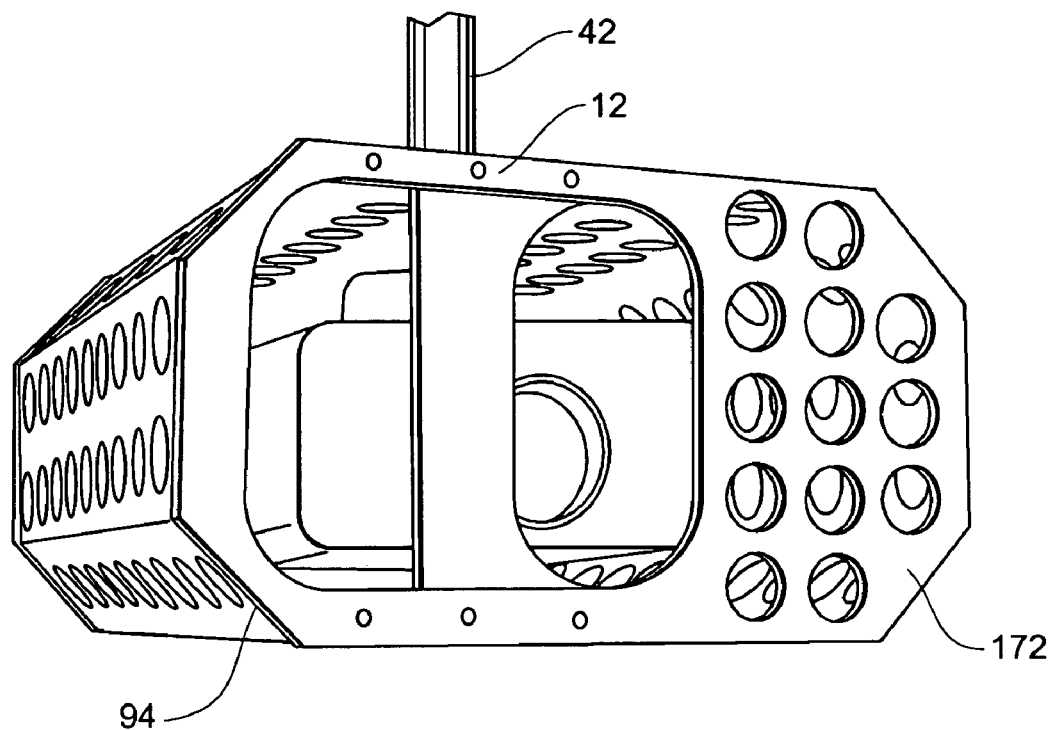
FIG. 8 is a perspective view of a tamper resistant mounting and enclosure system according to the present invention.
Figure 9:
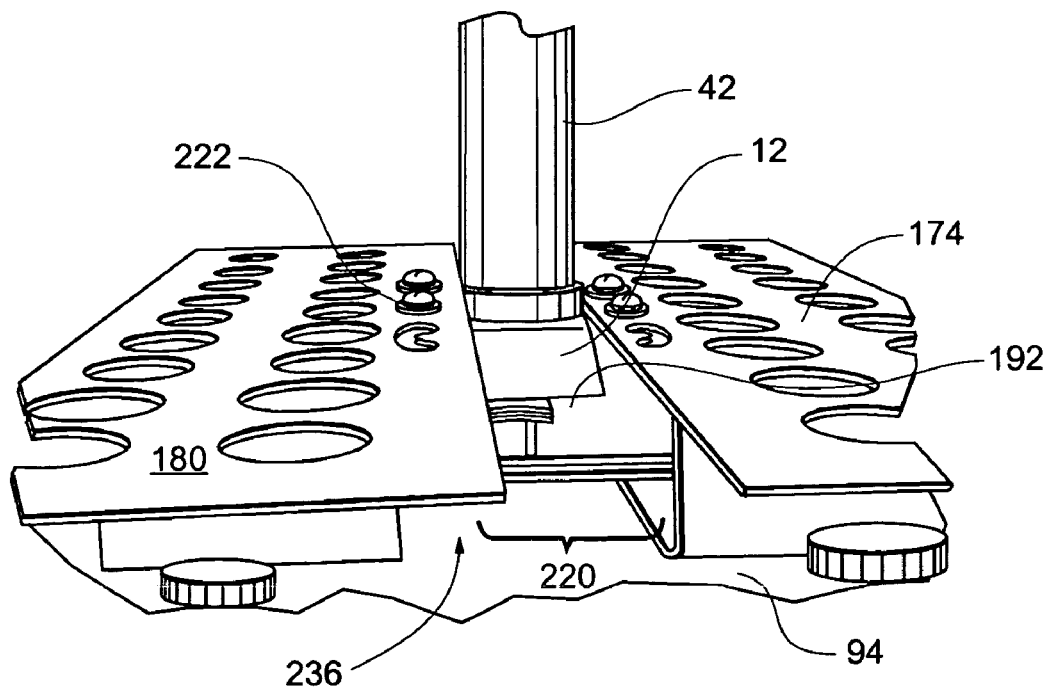
FIG. 9 is a perspective view of the top of the enclosure at an intermediate step during installation.
Figure 9A:
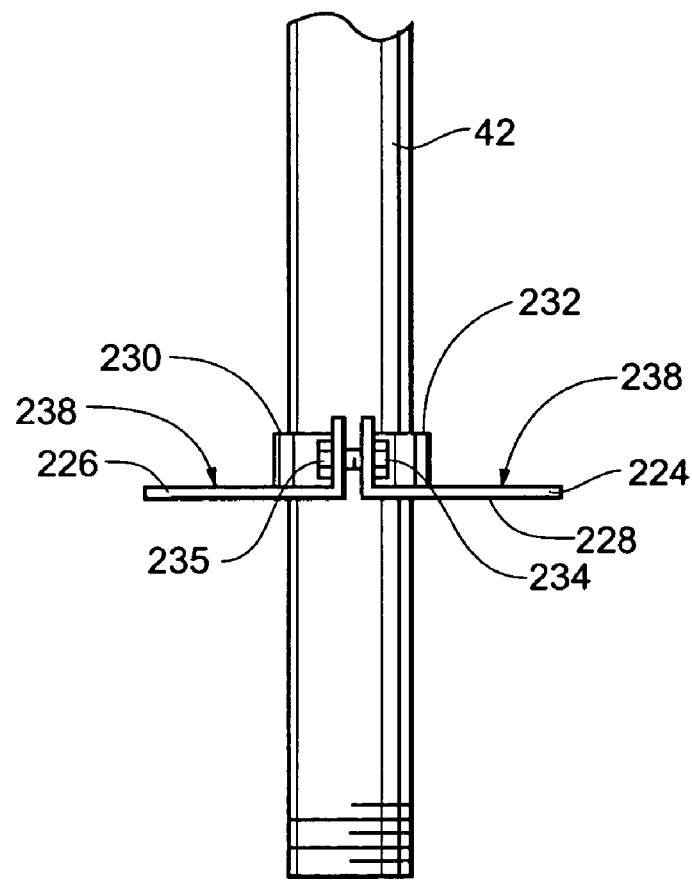
FIG. 9A is an elevation view of a clamp for attaching the enclosure to a suspension member.
Figure 9B:
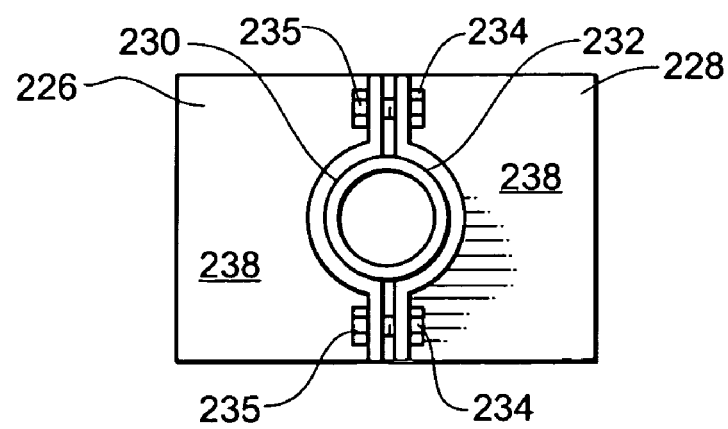
FIG. 9B is a plan view of the clamp of FIG. 9A.

Mounting system 10 may also include a tamper resistant projector enclosure system 172 as depicted in FIGS. 8–9B. The enclosure system 172 generally includes an integral surround portion 174, end caps 176, 177, and locking bars 178.

Surround portion 174 has a top 180, a bottom 182, sides 184 and open ends 186. Preferably, surround portion 174 is formed from a single piece of metallic material, such as light gauge steel, and is joined at a single longitudinal seam 188. Openings 190 are provided for ventilation and heat rejection purposes. Top 180 has a slot 192 extending from proximate a center region 194 to one of the open ends 186. Slot 192 is dimensioned so as to fit around pipe hanger 42 as will be further discussed hereinbelow.

End caps 176, 177, fit over and cover each of open ends 186 of surround portion 174. End cap 176 has a lens cutout portion 196. An adjustably positionable cover panel 198 is provided to enable selective partial blocking of the cutout portion 196 to restrict access to the inside of the enclosure, while also providing flexibility for the different lens positions of projectors of various makes and models.

End caps 176, 177, may be secured to surround portion 174 with tamper resistant fasteners 200 to inhibit unauthorized access to the inside of the enclosure. As described hereinabove, tamper resistant fasteners 200 may be any suitable standard or proprietary tamper resistant or security fastener. Additionally, one or more tamper resistant fasteners may be used to secure cover panel 198 to end cap 176.

For additional security, end caps 176, 177, may be locked in place on surround portion 174 with one or more locking bars 178. Each locking bar 178 has a hooked end 202 and a straight end 204. Straight end 204 has an aperture 206 for receiving a lock 208. End cap 176 has engaging structures 210 in the form of apertures 212 for receiving the hooked end 202 of locking bars 178. End cap 177 has corresponding slots 214, for receiving straight ends 204 of locking bars 178.

In operation, with end caps 176, 177, in place on surround portion 174, the straight end 204 of each locking bar 178 is inserted through aperture 212 and slot 214, so that straight end extends through slot 214 outside the enclosure and hooked end 202 is engaged in aperture 212. Hooked end 202 is hooked over the periphery 216 of end cap 176. In this position, aperture 206 is just outside the enclosure proximate the outside surface 218 of end cap 177. Lock 208 may then be locked through aperture 206, thereby inhibiting withdrawal of locking bar 178 and securing end caps 176, 177, on surround portion 174.

The tamper resistant projector enclosure system 172 may be installed to enclose a projector 94 that is already suspended from an overhead structure without demounting the projector as depicted in FIG. 9. As previously described, slot 192 is dimensioned so as to fit around a suspension member 14, such as pipe hanger 42. With end cap 176 removed, slot 192 has an open end 220, enabling surround portion 174 to be slid over projector 94 with suspension member 14 in slot 192. Surround portion 174 may then be secured to adjustable bracket 12 with a tamper resistant fastener 222. End cap 176 may then be secured in place on surround portion 174, completing the enclosure.

A clamp 224 may be fastened around pipe hanger 42 as depicted in FIGS. 9A and 9B as an alternative for securing surround portion 174 to the mounting system 10. Clamp 224 has a pair of clamping members 226, 228, each with an arcuate shaped pipe interface surface 230, 232. Clamping members 226, 228, are fastened together with fasteners 234 disposed on either side of pipe interface surfaces 230, 232. Fasteners 234 may be secured in place with tamper resistant nuts 235, which may be those depicted in FIG. 4G or any other tamper-resistant nut.

In operation, clamp 224 is positioned with arcuate shaped pipe interface surfaces 230, 232, surrounding pipe hanger 42. Fasteners 234 are tightened, thereby securely clamping clamp 224 onto pipe hanger 42. Surround portion 174 may then be positioned around projector 94 as before, with pipe hanger 42 in slot 192, and top 180 above clamp 224. Once in position, the inside surface 236 of top 180 rests on the upper surface 238 of clamp 224.

One or more tamper resistant fasteners 222 may again be used to secure surround portion 174 to clamp 224, thereby inhibiting removal of the enclosure system 172, and coincident tampering or theft of projector 94. In addition to providing a desirable degree of tamper and theft resistance, the enclosure system 172 also provides a measure of protection to the projector 94 against impact from objects when the projector is mounted in a setting where such impacts are a concern (i.e. basketballs in a gymnasium).

What is claimed is:

1. A visual projection device and tamper resistant mounting system for adjustably attaching the visual projection device to a suspension member fixedly attached to an overhead structure, the system comprising:

a device interface bracket operably coupled to the projection device with a first tamper resistant fastener; and a suspension member interface portion operably coupled to said device interface bracket, said suspension member interface portion adapted to be attachable to the suspension member with a second tamper resistant fastener, said device interface bracket and said suspension member interface portion being secured together with a third tamper resistant fastener, each of the first, second, and third tamper resistant fasteners having coding for receiving a correspondingly coded tool for installing and removing the fastener, whereby the coding inhibits engagement and removal of the fastener with any tool other than the correspondingly coded tool, the system further comprising an enclosure enclosing said projection device, the device interface bracket, and the suspension member interface portion, said enclosure being attached to said mounting system with at least one tamper resistant fastener.

2. The visual projection device and system of claim 1, wherein said enclosure includes an integral surround portion having a top, a bottom, a pair of opposing sides, and a pair of open ends, and a pair of end caps adapted to fit over and close said open ends, each of said pair of end caps being secured to the surround portion with at least one tamper resistant fastener.

3. The visual projection device and system of claim 2, further comprising at least one lock and an elongate locking bar having a hooked end and a opposing straight end with an aperture for receiving said lock, wherein one of said end caps has an engaging structure for receiving said hooked end and the other of said end caps has an opening formed therethrough, wherein said locking bar is positionable so that said straight end extends through said opening with the aperture outside of the enclosure when said hooked end is received in said engaging structure, and wherein said locking bar lockably secures said end caps to said surround portion when said lock is received in said aperture in said straight end.

4. The visual projection device and system of claim 2, wherein said mounting system further comprises at least one elongate suspension member adapted to couple said suspension member interface portion to the overhead structure, wherein said top of said surround portion has a elongate slot extending from one of said open ends to proximate the center of said top, and wherein said slot is adapted to fit around said suspension member.

5. The visual projection device and system of claim 4, further comprising a clamp engaged with said enclosure, said clamp having a pair of clamping members and at least one tamper resistant fastener operably coupling said pair of clamping members, said clamping members arranged and adapted to clamp said at least one suspension member therebetween when the tamper resistant fastener operably coupling said pair of clamping members is tightened.

6. The visual projection device and system of claim 5, wherein said enclosure is attached to said clamp with at least one tamper resistant fastener.

* * * * *

UNITED STATES PATENT AND TRADEMARK OFFICE
CERTIFICATE OF CORRECTION

PATENT NO. : 7,156,359 B2
APPLICATION NO. : 10/821659
DATED : January 2, 2007
INVENTOR(S) : Dittmer et al.

It is certified that error appears in the above-identified patent and that said Letters Patent is hereby corrected as shown below:

Column 2, Line 17:
After "and" insert --the--.

Column 4, Line 16:
After "may" insert --be--.

Column 6, Line 23:
Delete "y -axis," and insert --y-axis,--.

Column 8, Line 30:
After "and" delete "a" and insert --an--.

Column 8, Line 45:
After "has" delete "a" and insert --an--.

Signed and Sealed this

Thirtieth Day of October, 2007

JON W. DUDAS
*Director of the United States Patent and Trademark Office*